Figure 1:
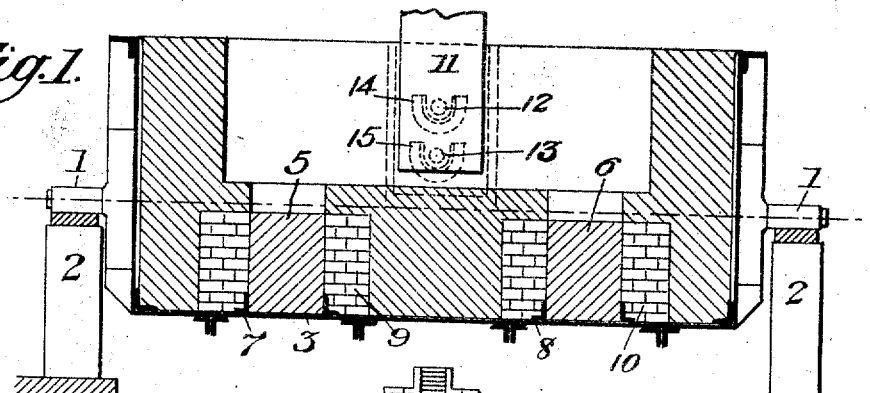

P. GIROD.

ELECTRIC FURNACE FOR METALLURGICAL PURPOSES.

APPLICATION FILED AUG. 5, 1909.

Reissued Dec. 27, 1910.

13,186.

2 SHEETS—SHEET 1.

Witnesses.

F. E. Rockwood

R. C. Grant

Inventor:

Paul Girod by John Thomas Atty.

P. GIROD.

ELECTRIC FURNACE FOR METALLURGICAL PURPOSES.

APPLICATION FILED AUG. 5, 1909.

Reissued Dec. 27, 1910.

13,186.

2 SHEETS—SHEET 2.

Witnesses.

J. E. Rockwell

Inventor.

Paul Girod by John C. Lemmia

Atty.

BEST AVAILABLE COPY

UNITED STATES PATENT OFFICE.

PAUL GIROD, OF UGINE, FRANCE.

ELECTRIC FURNACE FOR METALLURGICAL PURPOSES.

13,186. Specification of Reissued Letters Patent. Reissued Dec. 27, 1910.

Original No. 921,228, dated May 11, 1909, Serial No. 292,617. Application for reissue filed August 5, 1909. Serial No. 511,476.

*To all whom it may concern:*

Be it known that I, PAUL GIROD, residing at Ugine, France, have invented certain new and useful Improvements in Electric Furnaces for Metallurgical Purposes, which improvements are fully set forth in the following specification.

The electric furnaces at present in use for manufacturing steel and soft metals, are provided with electrodes of opposite polarity and a hearth which usually only acts as the receiver of the material to be melted or of the molten material.

This invention has for its object an electric furnace for the manufacture of steel or soft metal in which one of the electrodes is replaced by a pole piece embedded in the furnace hearth in such a manner that it may not be exposed to too great a temperature and that the metal in contact with it may be solidified to an extent determined by experience. This pole may be formed of graphite or metal or of any other suitable conducting substance; its interior may or may not be cooled.

Figure 2:
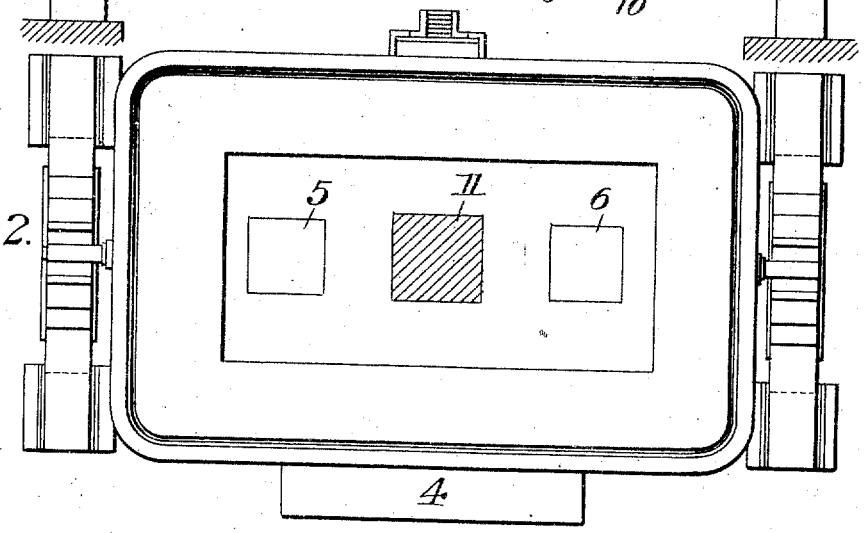
Figure 3:
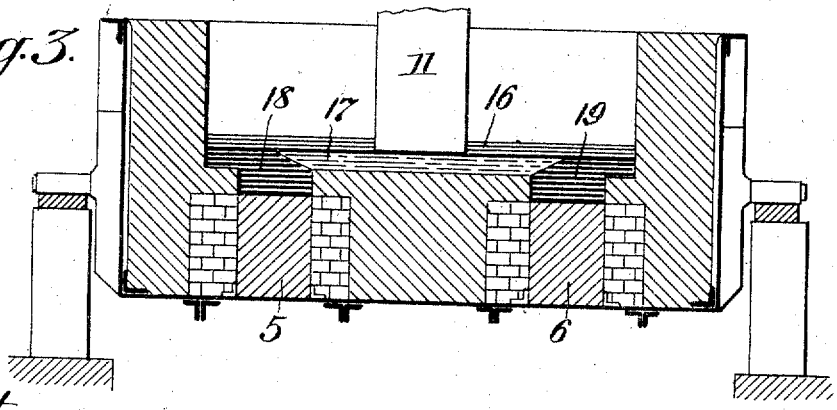
Figure 4:
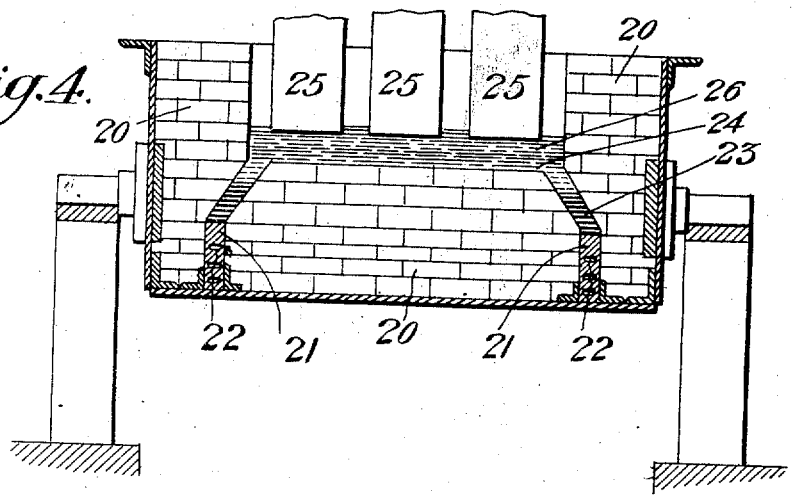
Figure 5:
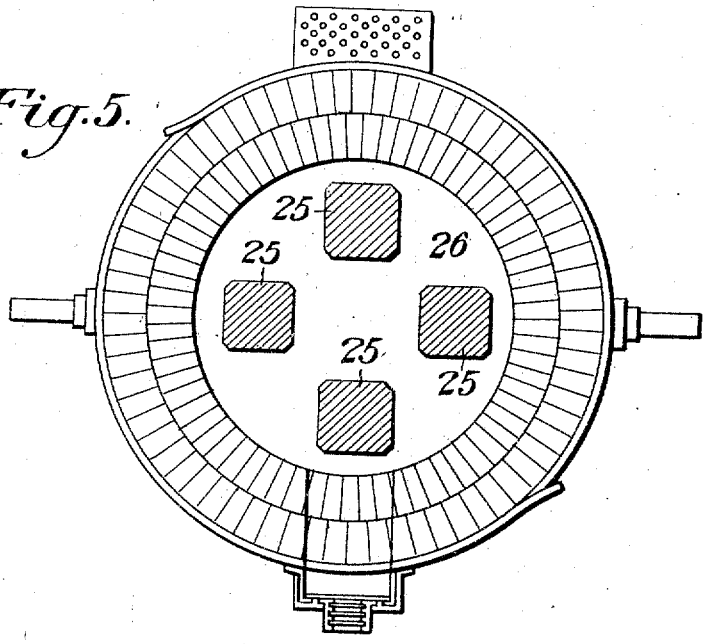

The accompanying drawings illustrate two furnaces constructed in accordance with this invention. In the drawings:

Figure 1 is a view in longitudinal section through a furnace constructed in accordance with the present invention, exhibiting the same as it appears when empty. Fig. 2 is a horizontal sectional view of the same. Fig. 3 is a view similar to Fig. 1 exhibiting the furnace at work. Fig. 4 is a view in longitudinal section of a modified form of furnace. Fig. 5 is a horizontal sectional view of the furnace shown in Fig. 4.

The rectangular furnace consists of a metal frame, mounted on a pair of trunnions 1, carried by supports 2, which allow the furnace to be tilted by hand or by suitable mechanism. The bottom 3 (provided as shown in Fig. 2 with a laterally projecting portion 4, which serves to introduce the current) carries two electrodes 5 and 6, embedded in frames 7 and 8, formed of angle irons for the purpose of insuring better electric contact with the bottom 3. These electrodes are surrounded by masonry 9 and 10 formed of refractory bricks, preferably of magnesia or aluminous silicates, because such bricks, when exposed to heat, do not become appreciably conductive. The remainder of the furnace is then entirely surrounded with masonry as shown in Figs. 1 and 2, formed either of refractory bricks or of the mineral to be treated or of any other materials fulfilling the desired object.

A single or multiple movable electrode 11 may be moved by hand or mechanically in such a manner as to be lowered into the interior of the furnace.

The tapping holes 12 and 13, shown in dots in Fig. 1, are arranged at different levels either at the same side of the furnace, or on opposite sides. At this point the refractory mass is made thicker, as shown in Fig. 2. This thicker portion is arranged in such a manner that it is possible to remove the part of the metal which surrounds it and to thus replace the tapping holes which it bears.

If it be desired for example to manufacture soft ferro-chrome, the electrodes 5 and 6 are preferably merely composed of blocks of graphite. It will be necessary, therefore, to cover them with a layer of metal for the purpose of preventing their contact with the metal in a state of fusion. For this purpose the ferro-chrome may be cast into the cavities or melted *in situ* by means of the electric current or again by merely placing pieces of ferro-chrome above these electrodes.

In order to commence working the furnace, a number of small pieces of carbon or of metal are arranged upon the bottom between the electrodes 5 and 6 which are covered with cast metal, or with small pieces of the manufactured product. The upper electrode is then lowered, and an arc is formed; the furnace is now charged, the material fuses and the fused charge and the slag form a resistance, which usually causes the extinction of the arc. If the cavities above the electrodes have been previously filled with cast metal which has solidified, the heat at this point is not sufficiently great to again fuse the metal; if, on the contrary, pieces of ferro-chrome or other products have been placed in the cavities for starting the furnace, the metal in the process of the other hand, the size of the electrodes, and in view of the distance of the cavities from the main source of heat, amalgamates all the pieces previously introduced into one, and solidifies on top of the electrodes. On the other hand, the size of the electrodes, and therefore of the solidified metal, is made sufficiently large that no heating by resistance takes place, as this would cause the fusion of the metal. We have, therefore, a furnace with one or more upper electrodes and one or more lower electrodes, the portion of the lower electrodes in contact with the metal in fusion being in this case of the same metal as that which is being fused, ferro-chrome, for example. In such a furnace, therefore, the carbon of the lower electrodes is never in contact with the fused metal and the upper electrode is regulated in such a manner that it also does not touch the fused metal, but only the slag formed by the fluxes and the fused ore.

Fig. 3 shows the furnace at work. The electrode 11 is immersed in the layer of slag 16, floating on the layer 17 of fused metal which covers the deposit 18, 19, of metal solidified at the lower electrodes 5 and 6.

The furnace thus constituted may work with a continuous or alternating current, etc., and at various voltages; one or more upper electrodes form one of the poles, and one or more electrodes, embedded in the masonry and protected by a layer of solidified metal, the other pole.

The lower electrodes may be rendered electrically independent of the hearth, by forming in the masonry a space for the passage of the electric leads and by insulating these leads in their passage through the sheet metal bottom 3. In this case, the different electrodes may be connected together in parallel or in series. The electrodes embedded in the masonry may also be placed at the sides of the furnace; however, they should always be arranged in such a manner that the metal in their neighborhood may be solidified, that is to say, they should not be too near to the upper electrode. The regulation of the temperature in the furnace moreover allows the zone of fusion to be limited.

The metal and slag may be separately tapped through holes arranged at different levels if necessary, or at the same time through a single hole.

The furnace may without departing from this invention be a fixed one and it may if necessary be provided with a cover.

Figs. 4 and 5 show an oscillating circular furnace, especially designed for the manufacture of steel, cast iron, etc. In this case, the pole embedded in the masonry 20 is preferably formed of a cast iron ring 21, provided with a water circulation 22. This ring becomes immediately covered with a layer 23 of solidified metal which then itself leads the current to the metal 24 in a state of fusion. The upper pole is formed of one or several electrodes 25 and the current passes through the slag 26 and the fused ore.

As above stated, the electric lead embedded in the masonry may equally well be arranged at the sides or anywhere else, either by means of a circular continuous ring, as is the case in this furnace, or by means of separate electrodes, the said electrodes being formed either of cast iron, graphite, or of any other conducting material. It is sufficient merely that they are always placed in such a manner as not to attain too high a degree of temperature which would melt the metal which is intended to serve as a connection between the fused metal and the said electrodes. The slag serves as a resistance between the fused metal and the electrodes. The furnace may moreover be used equally as a simple arc furnace by causing the electrode to project above the slag.

The manufacture of steel and of cast iron takes place in exactly the same manner as in the usual methods of manufacture; refining, decarbonization, desulfurizing, dephosphorizing, etc., may take place by any of the usual methods.

The voltage is chosen in a suitable manner for each manufacture; in certain cases, it may be fairly low and the layer of slag above the fused metal be extremely thin; in other cases, it is made higher, if the resistance be greater.

In certain of the claims forming a part of this specification, I have referred to the electrodes as "out of vertical alinement", and as "out of alinement with each other both vertically and horizontally." These expressions are to be understood in the sense that "out of vertical alinement" means that the working ends of the opposed electrodes (in order to extend the path of the electric heating current through the bath and therefore to increase the generation of heat in the bath) are not in the same vertical line; and that "out of alinement with each other both vertically and horizontally" means that the working ends of the opposed electrodes are not in the same vertical line and are at different horizontal levels.

Having thus fully described my invention, what I claim is:—

1. An electric metallurgical furnace comprising a refractory working hearth, a lower electrode, means for causing part of the metal to unite with the same, and an upper electrode held in contact with the slag but out of contact with the fused metal; substantially as described.

2. An electric furnace having opposed upper and lower electrodes out of vertical alinement, the lower electrode being formed partly by the metal to be treated; substantially as described.

3. An electric furnace having opposed upper and lower electrodes out of vertical alinement, and means for cooling the lower electrode, part of said lower electrode being formed by the metal to be treated; substantially as described.

4. An electric furnace embodying opposed electrodes that are out of alinement with each other both vertically and horizontally, that portion of one of the electrodes in contact with the metal in fusion being of the same metal as that which is being fused, and the other electrode being adjustable whereby it may be kept out of contact with the fused metal and in contact only with the slag formed by the fluxes and the fused ore; substantially as described.

5. An electric furnace embodying opposed upper and lower electrodes, a refractory working hearth having formed within it a metal receiving recess at the end of one of the electrodes, the other electrode being arranged to remain in contact with the slag formed by the fluxes and the fused ore; substantially as described.

6. An electric furnace embodying upper and lower electrodes out of vertical alinement, the lower electrode being annular, and the furnace having a metal-receiving chamber over said lower annular electrode; substantially as described.

7. An electric furnace comprising a refractory working hearth of relatively large area with respect to its depth, a lower electrode passing through said hearth and embedded therein, means for causing part of the metal bath to unite with said electrode, and an upper depending electrode, adjustable with respect to the furnace charge; substantially as described.

8. An electric furnace having a refractory working hearth for the reception of metal, a movable upper electrode adapted to be lifted out of contact with the melted metal when the furnace is in operation, and a lower electrode passing through said hearth for electrical connection with the working electric heating current, said lower electrode consisting in part of a liquid portion of the metal under treatment; substantially as described.

9. An electric furnace having a refractory working hearth for the reception of metal, a movable upper electrode adapted to be lifted out of contact with the melted metal when the furnace is in operation, and a lower electrode passing through said hearth for electrical connection with the working electric heating current, said lower electrode consisting in part of a solidified portion of the metal under treatment; substantially as described.

10. An electric furnace having a refractory working hearth for the reception of metal, a movable upper electrode adapted to be lifted out of contact with the melted metal when the furnace is in operation, and a lower electrode passing through said hearth for electrical connection with the working electric heating current, said lower electrode consisting in part of a liquid portion and in part of a solid portion of the metal under treatment; substantially as described.

11. An electric furnace having a refractory working hearth for the reception of metal, a movable upper electrode adapted to be lifted out of contact with the melted metal when the furnace is in operation, and a lower electrode passing through said hearth for electrical connection with the working electric heating current, said lower electrode consisting in part of a liquid portion of the metal under treatment and in part of a solid conductor capable of maintaining electrical connection with said liquid portion; substantially as described.

In testimony whereof, I affix my signature, in presence of two witnesses.

PAUL GIROD.

Witnesses:
O. Novel,
G. A. Maillet.

Correction in Reissue Letters Patent No 13,186.

It is hereby certified that in Reissue Letters Patent No. 13,186, granted December 27, 1910, upon the application of Paul Girod, of Ugine, France, for an improvement in "Electric Furnaces for Metallurgical Purposes," an error appears in the printed specification requiring correction as follows: Page 1, line 104, the words "the other hand, the size of the electrodes" should be stricken out and the words *formation flows into the said cavities*, be inserted instead; and that the said Letters Patent should be read with this correction therein that the same may conform to the record of the case in the Patent Office.

Signed and sealed this 31st day of January, A. D., 1911.

[SEAL.] C. C. BILLINGS,

*Acting Commissioner of Patents.* electrode, part of said lower electrode being formed by the metal to be treated; substantially as described.

4. An electric furnace embodying opposed electrodes that are out of alinement with each other both vertically and horizontally, that portion of one of the electrodes in contact with the metal in fusion being of the same metal as that which is being fused, and the other electrode being adjustable whereby it may be kept out of contact with the fused metal and in contact only with the slag formed by the fluxes and the fused ore; substantially as described.

5. An electric furnace embodying opposed upper and lower electrodes, a refractory working hearth having formed within it a metal receiving recess at the end of one of the electrodes, the other electrode being arranged to remain in contact with the slag formed by the fluxes and the fused ore; substantially as described.

6. An electric furnace embodying upper and lower electrodes out of vertical alinement, the lower electrode being annular, and the furnace having a metal-receiving chamber over said lower annular electrode; substantially as described.

7. An electric furnace comprising a refractory working hearth of relatively large area with respect to its depth, a lower electrode passing through said hearth and embedded therein, means for causing part of the metal bath to unite with said electrode, and an upper depending electrode, adjustable with respect to the furnace charge; substantially as described.

8. An electric furnace having a refractory working hearth for the reception of metal, a movable upper electrode adapted to be lifted out of contact with the melted metal when the furnace is in operation, and a lower electrode passing through said hearth for electrical connection with the working electric heating current, said lower electrode consisting in part of a liquid portion of the metal under treatment; substantially as described.

9. An electric furnace having a refractory working hearth for the reception of metal, a movable upper electrode adapted to be lifted out of contact with the melted metal when the furnace is in operation, and a lower electrode passing through said hearth for electrical connection with the working electric heating current, said lower electrode consisting in part of a solidified portion of the metal under treatment; substantially as described.

10. An electric furnace having a refractory working hearth for the reception of metal, a movable upper electrode adapted to be lifted out of contact with the melted metal when the furnace is in operation, and a lower electrode passing through said hearth for electrical connection with the working electric heating current, said lower electrode consisting in part of a liquid portion and in part of a solid portion of the metal under treatment; substantially as described.

11. An electric furnace having a refractory working hearth for the reception of metal, a movable upper electrode adapted to be lifted out of contact with the melted metal when the furnace is in operation, and a lower electrode passing through said hearth for electrical connection with the working electric heating current, said lower electrode consisting in part of a liquid portion of the metal under treatment and in part of a solid conductor capable of maintaining electrical connection with said liquid portion; substantially as described.

In testimony whereof, I affix my signature, in presence of two witnesses.

PAUL GIROD.

Witnesses:
O. Novel,
G. A. Maillet.

Correction in Reissue Letters Patent No 13,186.

It is hereby certified that in Reissue Letters Patent No. 13,186, granted December 27, 1910, upon the application of Paul Girod, of Ugine, France, for an improvement in "Electric Furnaces for Metallurgical Purposes," an error appears in the printed specification requiring correction as follows: Page 1, line 104, the words "the other hand, the size of the electrodes" should be stricken out and the words *formation flows into the said cavities*, be inserted instead; and that the said Letters Patent should be read with this correction therein that the same may conform to the record of the case in the Patent Office.

Signed and sealed this 31st day of January, A. D., 1911.

[SEAL.] C. C. BILLINGS,

*Acting Commissioner of Patents.*